(12) United States Patent
Parnes

(10) Patent No.: US 7,602,805 B2
(45) Date of Patent: *Oct. 13, 2009

(54) CIRCUITS AND METHODS FOR DETECTING THE MODE OF A TELECOMMUNICATIONS SIGNAL

(76) Inventor: Gary Parnes, 4285 Cottonwood La., Plymouth, MN (US) 55441

( * ) Notice: Subject to any disclaimer, the term of this patent is extended or adjusted under 35 U.S.C. 154(b) by 1114 days.

This patent is subject to a terminal disclaimer.

(21) Appl. No.: 10/652,060

(22) Filed: Aug. 29, 2003

(65) Prior Publication Data
US 2004/0042425 A1 Mar. 4, 2004

Related U.S. Application Data

(63) Continuation of application No. 09/191,501, filed on Nov. 13, 1998, now Pat. No. 6,614,801.

(51) Int. Cl.
H04J 3/16 (2006.01)
(52) U.S. Cl. .................... 370/465; 370/232
(58) Field of Classification Search .......... 370/217, 370/219, 221, 401, 402, 265, 352–358, 359, 370/389, 229, 230, 232, 234, 235, 465
See application file for complete search history.

(56) References Cited

U.S. PATENT DOCUMENTS

| | | | | |
|---|---|---|---|---|
| 4,667,065 A | 5/1987 | Bangerter | | 379/351 |
| 4,672,602 A | 6/1987 | Hargrave et al. | | 370/58 |
| 5,012,470 A | 4/1991 | Shobu | | 370/110.1 |
| 5,119,412 A | 6/1992 | Attallah | | 379/102 |
| 5,159,465 A * | 10/1992 | Maemura et al. | | 358/405 |
| 5,173,786 A * | 12/1992 | Nakagawa | | 358/405 |
| 5,267,301 A | 11/1993 | Nishii | | 379/93 |
| 5,271,058 A | 12/1993 | Andrews et al. | | 379/210 |
| 5,299,260 A | 3/1994 | Shaio | | 379/265 |
| 5,361,374 A | 11/1994 | Sasaki et al. | | 395/800 |
| 5,387,983 A * | 2/1995 | Sugiura et al. | | 358/434 |
| 5,400,327 A | 3/1995 | Dezonno | | 370/62 |
| 5,481,605 A | 1/1996 | Sakurai | | 379/243 |
| 5,493,609 A * | 2/1996 | Winseck et al. | | 379/93.08 |
| 5,526,416 A | 6/1996 | Dezonno et al. | | 379/265 |
| 5,548,781 A * | 8/1996 | Huang | | 710/11 |
| 5,557,668 A | 9/1996 | Brady | | 379/212 |

(Continued)

FOREIGN PATENT DOCUMENTS

JP 04373255 12/1992

(Continued)

OTHER PUBLICATIONS

English-language Abstract of JP 04 373255 A, published Dec. 25, 1992 (Ricoh Co. Ltd)., cited above.

*Primary Examiner*—Brenda Pham
(74) *Attorney, Agent, or Firm*—McDonnell Boehnen Hulbert & Berghoff LLP

(57) ABSTRACT

A method for detecting the mode of a telecommunications signal is provided. The method receives the telecommunications signal and contemporaneously evaluates the telecommunications signal for compliance with at least two signal modes. When the evaluation indicates that the signal conforms to a first mode, the signal is processed as a first mode signal. When the evaluation indicates that the signal conforms to a second mode, the signal is processed as a second mode signal.

37 Claims, 4 Drawing Sheets

U.S. PATENT DOCUMENTS

| | | | | |
|---|---|---|---|---|
| 5,563,937 A | * | 10/1996 | Bruno et al. | 379/265.11 |
| 5,572,585 A | | 11/1996 | Tsutsui | 379/242 |
| 5,572,586 A | | 11/1996 | Ouchi | 379/246 |
| 5,581,560 A | | 12/1996 | Shimada et al. | 370/527 |
| 5,633,924 A | | 5/1997 | Kaish et al. | 379/266 |
| 5,675,617 A | | 10/1997 | Quirk et al. | 375/365 |
| 5,684,825 A | | 11/1997 | Ko | 375/222 |
| 5,706,434 A | | 1/1998 | Kremen et al. | 395/200.09 |
| 5,923,815 A | * | 7/1999 | Park | 386/111 |
| 5,974,055 A | | 10/1999 | Imanishi | 370/503 |
| 6,130,625 A | | 10/2000 | Harvey | 340/325.72 |
| 6,259,706 B1 | | 7/2001 | Shimada | 370/466 |
| 6,614,801 B1 | * | 9/2003 | Parnes | 370/465 |
| 7,426,311 B1 | * | 9/2008 | Chun et al. | 382/250 |

FOREIGN PATENT DOCUMENTS

| | | |
|---|---|---|
| WO | WO-97/29563 | 8/1997 |

\* cited by examiner

CIRCUITS AND METHODS FOR DETECTING THE MODE OF A TELECOMMUNICATIONS SIGNAL

RELATED APPLICATION

This application is a continuation under 37 C.F.R. 1.53(b) of U.S. patent application Ser. No. 09/191,501 filed Nov. 13, 1998, now U.S. Pat. No. 6,614,801 which application is incorporated herein by reference.

TECHNICAL FIELD OF THE INVENTION

The present invention relates generally to the field of telecommunications and, in particular, to circuits and methods for detecting the mode of a telecommunications signal.

BACKGROUND

Telecommunications systems connect users at geographically dispersed locations. The public switched telephone network (PSTN) evolved around providing a narrow-band medium for carrying voice traffic between users. More recently, the PSTN has been used to carry data to and from computers that connect to the PSTN with modems. These modems typically carry data with bit rates of up to 56 Kbps.

The integrated services digital network (ISDN) was developed to carry higher bandwidth traffic over the existing local loop facilities of the PSTN. This network allows voice or data to be carried in digital form from user to user over the network. Various protocols or modes exist for transporting data over an ISDN network. Thus, the existing networks provide means for transporting telecommunications signals of a number of different modes between users. These modes are, essentially, incompatible and conventional equipment is typically dedicated to a specific telephone number such that a specific device only receives signals of a designated mode.

For the reasons stated above, and for other reasons stated below which will become apparent to those skilled in the art upon reading and understanding the present specification, there is a need in the art for circuits and methods for handling a variety of signal modes with a single number.

SUMMARY OF THE INVENTION

The above mentioned problems with telecommunications circuits and other problems are addressed by the present invention and will be understood by reading and studying the following specification. A system and method for detecting the mode of a telecommunications signal is described which contemporaneously evaluates the signal for compliance with at least two signal modes. This evaluation is accomplished by analyzing a bit stream of the telecommunications signal over a period of time, e.g., up to 2 seconds. In one embodiment, the mode is determined when a frame is successfully decoded from the bit stream according to one of the signal modes. Further, the method also keeps a score for each mode as the signal is evaluated to assist in determining the mode of the signal.

In particular, in one embodiment, a method for detecting the mode of a telecommunications signal is provided. The method receives the telecommunications signal and contemporaneously evaluates the telecommunications signal for compliance with at least two signal modes. When the evaluation indicates that the signal conforms to a first mode, the signal is processed as a first mode signal. When the evaluation indicates that the signal conforms to a second mode, the signal is processed as a second mode signal.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
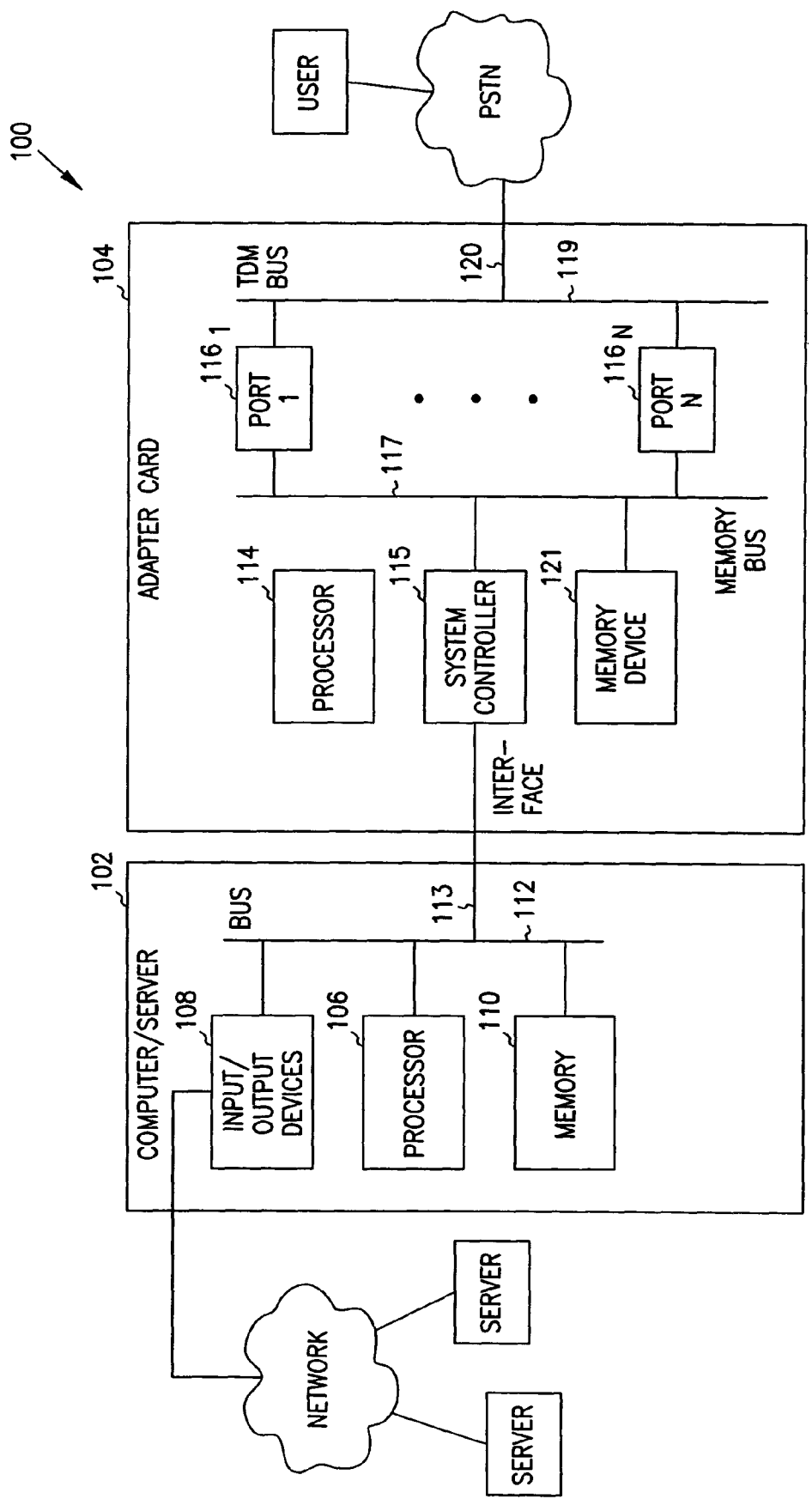
FIG. 1 is a block diagram of an illustrative embodiment of the present invention.

FIG. 1 is a block diagram of an illustrative embodiment of the present invention. System 100 includes computer 102 that is coupled to adaptor card 104. Adaptor card 104 provides a number of ports, $116_1, \ldots, 116_N$ for system 100 so as to allow system 100 to function as a Remote Access Server (RAS). Each port $116_i$ comprises a digital signal processor (DSP) and can receive signals in one of a number of modes. For example, port $116_1$ can receive signals in 56K HDLC mode, 64K HDLC mode, or other mode for telecommunications signals. Adaptor card 104 includes a process that is loaded into a port when an incoming signal is received to detect the mode of the signal.

Adaptor card 104 resides in an interface slot on the main or mother board of computer 102. Computer 102 comprises, for example, a microprocessor-based computer or server. Computer 102 includes processor 106, input/output devices 108, and memory 110 that are interconnected on the main board by bus 112. Input/output devices 108 include, for example, network connections, communications ports, and other conventional devices for connecting with external systems and networks.

Processor 106 is communicatively coupled to processor 114 of adaptor card 104 through interface 113 and system controller 115. Processor 114 communicates with ports $116_1, \ldots 116_N$, over bus 117.

Ports $116_1, \ldots, 116_N$ communicate with, for example, the public switched telephone network (PSTN) over communication link 120, e.g., T1, E1 or other appropriate communication link. Adaptor card 104 includes a time division multiplexing (TDM) bus 119 that couples ports $116_1, \ldots, 116_N$ with communication link 120.

In operation, adaptor card 104 detects the mode of an incoming telecommunications signal based on the bits in the bit stream of the telecommunications signal. When an incoming telecommunications signal is received, processor 114 places a selected port into reset, e.g., port $116_1$. A code image from memory devices 121 is loaded into port $116_1$. In one embodiment, this code image includes a detection process that detects the mode of the incoming telecommunications signal as well as code to process the signal in at least two modes. For example, the code image can include code to implement the processes described below with respect to FIGS. 2, 3A and 3B. Code to detect other appropriate modes can also be loaded into the selected port.

Processor 114 then takes port 116$_1$ out of reset. The detection process then contemporaneously analyzes the incoming telecommunications signal for compliance with at least two modes for a period of time, e.g., two seconds. This analysis for the two modes is accomplished as data is received.

If the detection process identifies the mode of the incoming telecommunications signal, then the port processes the signal accordingly. If, however, the mode is not identified by the detection process, then another code image, e.g., for processing an analog data stream, can be loaded into port 116$_1$. It is noted that in other embodiments, if the detection process fails to identify the mode of the telecommunications signal, then code containing additional detection algorithms can be loaded into the port.

Figure 2:
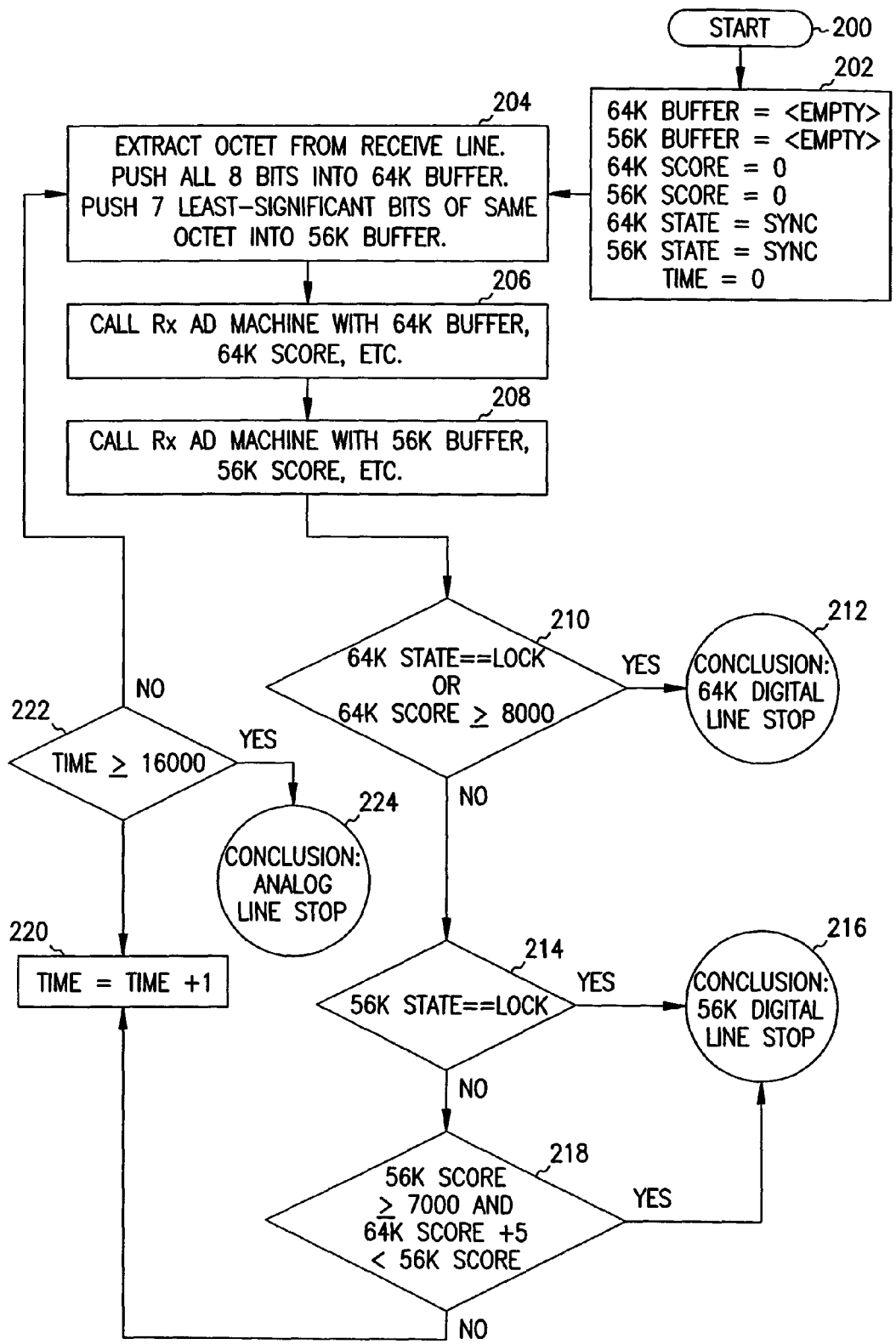
FIG. 2 is a flow chart of an embodiment of a process for detecting the mode of a telecommunications signal.

FIG. 2 is a flow chart of an embodiment of a process for detecting the mode of a telecommunications signal. In this embodiment, the process analyzes a bit stream of the telecommunications signal to determine whether the signal is in a 64 kbps high level data link control (HDLC) mode, a 56 kbps HDLC mode or another mode, e.g., an analog data stream. It is noted that this process can be adapted to detect other modes and other data rates for telecommunications signals.

To detect the mode of the telecommunications signal, the process contemporaneously processes the bit stream of the telecommunications signal under at least two potential modes for a time period, e.g., up to two seconds. During this time period, the process evaluates the signal's compliance with the potential modes.

As one measure of compliance, the process assigns a "score" to the modes under consideration as the bit stream is processed. The score for each mode is modified throughout the time period as the bit stream is processed. Each mode has a target score. When a target score is reached, the process identifies the mode that achieved the target score as the mode of the telecommunications signal.

Further, the process can detect the mode of the telecommunications signal based on compliance with other aspects of the mode. For example, the mode of the telecommunications signal can be identified when an error-free frame has been successfully decoded under one of the modes. Compliance in other aspects of a mode can also be used to identify the mode of the telecommunications signal.

The process of FIG. 2 begins analyzing a telecommunications signal (the "signal") at block 200. In one embodiment, this signal comprises a bit stream that is received from a digital communication line, e.g., an ISDN line. At block 202, the process initializes a number of variables used to monitor the compliance of the signal with two or more potential modes. For example, the process initializes the variables identified below in Table 1.

TABLE 1

| Variable | Description | Value |
| --- | --- | --- |
| 64K buffer | FIFO Queue for analyzing compliance with 64K HDLC mode | empty |
| 56K buffer | FIFO Queue for analyzing compliance with 56K HDLC mode | empty |
| 64K score | Running score of processing under the 64K HDLC mode | 0 |
| 56K score | Running score of processing under the 56K HDLC mode | 0 |
| 64K state | Derived state of processing under 64K HDLC mode | SYNC |
| 56K state | Derived state of processing under 64K HDLC mode | SYNC |
| Time | Running time from initiation of the detection process | 0 |

TABLE 1-continued

At block 204, the process extracts groups of bits (e.g., 8 bits or an octet) from the telecommunications line. The process further pushes the 8 bits into the 64K buffer for processing and monitoring as a 64K HDLC mode signal. Further, the process pushes the 7 least significant bits of the same octet into the 56K buffer for processing as a 56K HDLC mode signal.

At blocks 206 and 208 the process calls functions that test the data in the 64K buffer and the 56K buffer for compliance with their respective modes. These functions keep score for the modes under consideration using the 56K score and 64K score variables. These variables track how closely the signal fits within their associated modes of operation. For example, points can be awarded according to the following table:

TABLE 2

| Event | Points |
| --- | --- |
| Consecutive idle flags | 1 |
| Erroneous data frame | −1 x number of octets in frame |
| Aborted data frame | −1 x (number of octets in frame + 1) |

If a score falls below zero, the score is reset to zero. With this scoring format, the target score for a two second interval of a 64K HDLC mode signal is 8000 and the target score for a 56K HDLC mode signal is 7000 for a similar two second interval. This represents the number of idle flags that would be transmitted during half of this time period assuming no data frames are transmitted.

If a data frame is transmitted, then one of the modes of operation may successfully decode an error free data frame. In that case, the mode that decodes the error free data frame is declared the winner since the probability of decoding an error free data frame from an otherwise meaningless stream of data is effectively nil.

A specific embodiment of a test process using this scoring format is described with respect to FIGS. 3A and 3B below. It is noted that other scoring formats and criteria can be used to test the compliance of a signal with other particular modes of operation.

Beginning at block 210, the process analyzes the results of the data returned by the test functions. At block 210, the process determines whether the a 64K HDLC data frame has been decoded error-free (i.e., 64K state=Lock) or the whether the 64K HDLC mode has achieved its target score, e.g., 8000. If so, the process indicates that the telecommunications signal is in 64K HDLC mode at block 212. If not, the process proceeds to block 214.

At block 214, the process determines whether a 56K HDLC data frame has been decoded error-free (i.e., 56K state=lock). If so, the process proceeds to block 216 and indicates that the telecommunications signal is in 56K HDLC mode. If a 56K HDLC frame has not been decoded error-free, the process proceeds to block 218 and checks the score from the test function for the 56K HDLC mode. If the score is greater than 7000 and the score is at least 5 points greater than the score for the 64K HDLC mode, then the process determines that the telecommunications signal is a 56K HDLC signal at block 216. This addresses the unique case of misinterpreting a 64K non-shared-zero-bit idle pattern as a 56K shared-zero-bit idle pattern.

If, at block 218, the score for the 56K HDLC mode does not pass the tests, then the process proceeds to block 220. At block 220, the time variable is incremented. At block 222, the time variable is tested to determine whether the time period of, for example, 2 seconds has lapsed. If yes, then the process concludes at block 224 that the telecommunications signal is not in either 56K or 64K HDLC mode. If time has not elapsed, the process returns to block 204 and processes the next group of bits.

When the mode is determined, the process further processes the signal according to the identified mode.

Figure 3A:
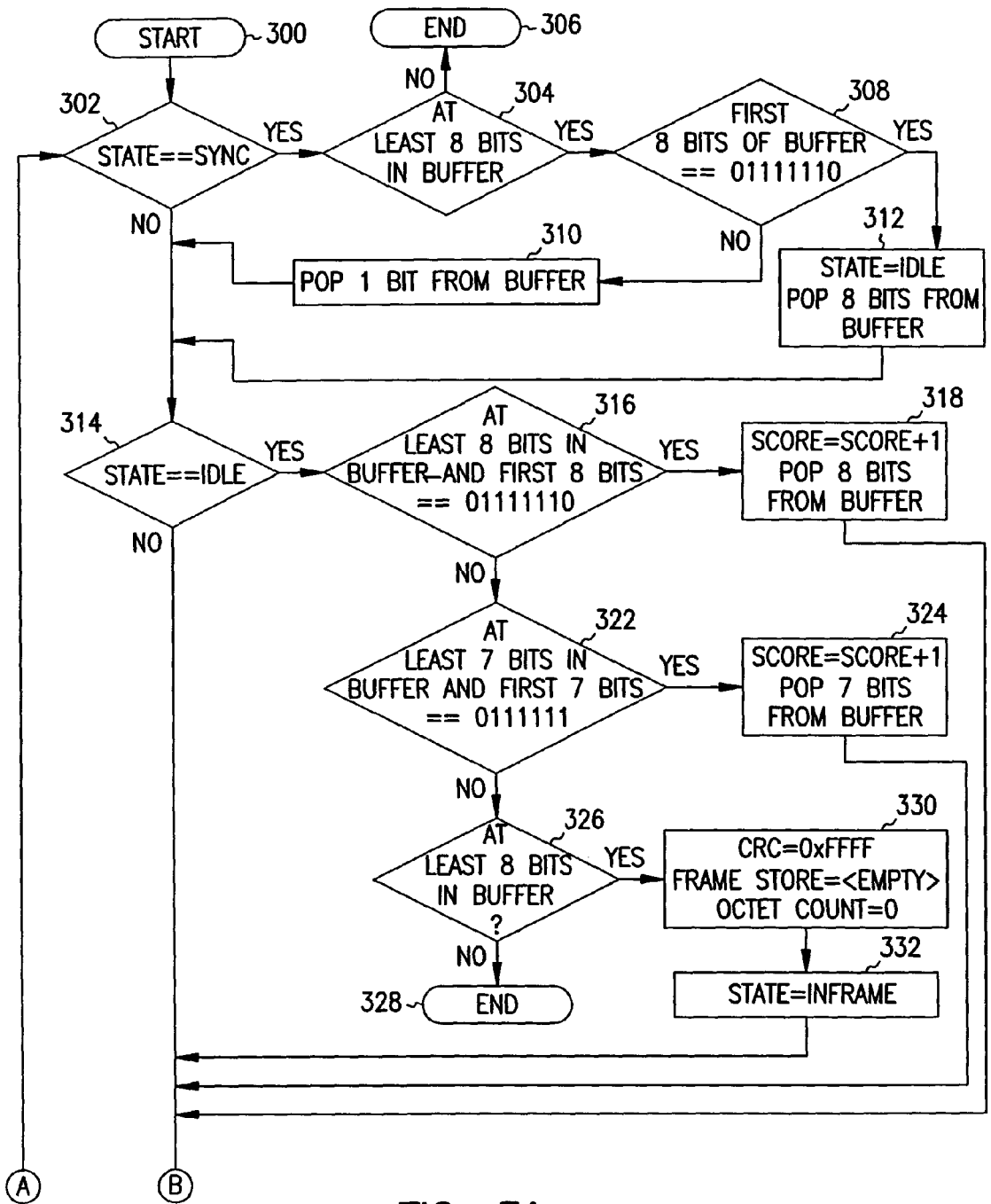
FIGS. 3A and 3B are flow charts of an embodiment of a process for evaluating the compliance of a telecommunications signal with a selected mode.
Figure 3B:
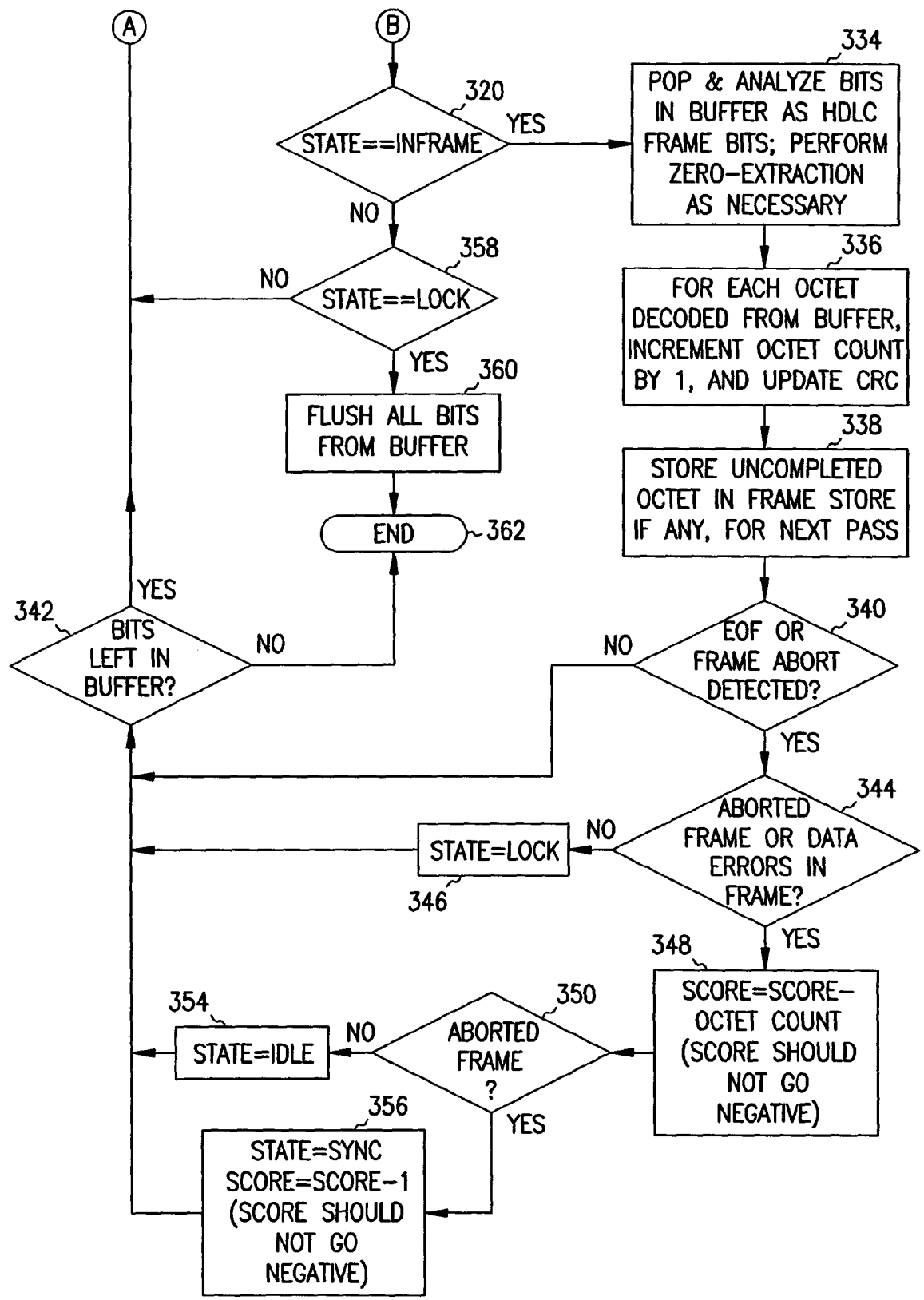

FIGS. 3A and 3B are flow charts of an embodiment of a process or "test function" for evaluating a telecommunications signal for compliance with a selected mode, e.g., 56K HDLC or 64K HDLC signal modes. The process of FIGS. 3A and 3B is repeatedly called by a higher level process, e.g., the process of FIG. 2 at blocks 206 and 208, to analyze the telecommunications signal as its bit stream is received. The process uses a number of variables identified below in Table 3.

TABLE 3

| Variable | Definition |
| --- | --- |
| State | Tracks the detected state of the telecommunications signal |
| Score | Tracks the score for the selected mode |
| CRC | Stores value for cyclic redundancy check as octets are processed |
| Frame Store | Buffers fragments of an octet at the end of a pass through the process |
| Octet Count | Counts the number of octets in a frame |

For HDLC signals, the process performs a number of different operations depending on the detected state of the signal as represented by the variable state. Table 4 identifies the various states of the telecommunications signal.

TABLE 4

| State | Description |
| --- | --- |
| SYNC | The initial state during which portions of the bit stream are compared with flags of the selected mode |
| IDLE | The state after detection of at least one idle flag |
| INFRAME | The state of the signal when a potential frame is being processed |
| LOCK | The state when an error-free frame has been processed |

Looking for an Idle Flag

The process begins at block 300. At block 302, the process determines whether the detected state of the telecommunications signal is still in the initial state, i.e., SYNC. If so, the process looks at the data in the buffer to determine whether the next group of bits, e.g., octet, is an idle flag. For HDLC, the idle flag is 01111110.

At block 304, the process determines whether there are sufficient bits in the buffer to make up an idle flag. If not, the process ends a block 306. If there are sufficient bits the process compares the first 8 bits in the buffer with the idle flag at block 308. If the bits match the idle flag, the process sets the state variable to IDLE and pops the 8 bits from the buffer. The process then proceeds to block 314.

If, at block 308, the bits do not match the idle pattern, the process pops one bit from the buffer at block 310 and proceeds to block 314.

Scoring Idle Flags and Determining When a Potential Frame is Being Processed

The next portion of the process processes idle flags and determines when a potential frame is being received. At block 314, the process determines whether an idle flag has been detected. If so, the process proceeds to block 316 and determines whether at least 8 bits are in the buffer and the first 8 bits match the idle flag. If so, the score variable is incremented by 1 and the 8 bits are popped from the buffer at block 318. This means that consecutive idle flags have been detected. The process then proceeds to block 320.

If, however, the next 8 bits in the buffer did not match the idle flag, then the process looks at the first 7 bits in the buffer at block 322. If the bits match the pattern 0111111, then the process proceeds to block 324 and increments the score variable indicating that consecutive idle flags have been detected. These seven bits are popped from the buffer. The process proceeds to block 320.

If the first 7 bits in the buffer do not match the pattern at block 322, the process proceeds to block 326. At block 326, the process determines whether there are at least 8 bits in the buffer. If not, the process ends at block 328. If there are at least 8 bits in the buffer, then the process determines that a potential frame has been detected because an octet that is not an idle flag was detected after an idle flag. At block 330, the process initializes the CRC, frame store and octet count variables to monitor the success in decoding the potential frame. At block 332, the process sets the state variable to INFRAME.

Processing a Frame

The next portion of the process handles the processing of a potential frame. At block 320, the process determines whether a potential frame is being processed. If so, the process proceeds to block 334 and pops and analyzes bits from the buffer according to the selected mode. For example, the process processes the bits as an HDLC signal and performs zero-extraction as necessary. At block 336, for each octet processed, the process increments the octet count variable by 1 and updates the CRC variable. At block 338, the process stores any incomplete octets in frame store, if any.

At block 340, the process determines whether an end-of-frame (EOF) or a Frame Abort flag was detected. If not, then the data being processed is still within the potential frame and the process proceeds to block 342.

If an EOF or Frame Abort flag was detected, the process proceeds to block 344. If, at block 344, the process determines that an error-free frame was received and that it was not aborted, the process proceeds to block 346 and sets the state variable to LOCK and proceeds to block 342.

If, however, the process determines at block 344, that the frame was aborted or that an erroneous frame was decoded then the process proceeds to block 348. At block 348, the score variable is decremented by the number of octets in the potential frame as indicated by the octet count variable. It is noted that the value of score is capped on the lower end to not go below zero. The process proceeds to block 350.

At block 350, the process determines whether the frame was aborted. If so, the process returns the state variable back to the IDLE state and proceeds to block 342. If the frame was aborted, the process proceeds to block 356. The state variable is returned to the SYNC state and the score is decremented by 1.

At block 342, the process determines if bits remain in the buffer. If not, then the process ends at block 362. If there are more bits, the process proceeds to block 302.

At block 358, the process determines whether an error-free frame has been decoded. If not, the process returns to block 302. If an error-free frame has been decoded, then the process proceeds to block 360 and flushes all of the bits from the buffer. The process ends at block 362.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the process for detecting the mode of a telecommunications signal is not limited to the HDLC modes described herein. Other modes, conventional or later developed, can be detected. Further, other aspects of the telecommunications signal can be monitored and scored to determine the mode of the signal.

What is claimed is:

1. An adaptor card to reside in an interface slot of a computer, comprising:
   an interface port to receive an incoming binary bit stream, the interface port including a digital signal processor, the incoming binary bit stream having a signal mode;
   a memory storing a code image; and
   an interface circuit to connect the interface port with the computer,
   wherein the digital signal processor is configured to execute the code image to detect the signal mode by analyzing the incoming binary bit stream to generate a measurement indicative of compliance with one of at least two potential signal modes, wherein the at least two potential signal modes includes at least a first telecommunication signal mode and a second telecommunication signal mode.

2. The adaptor card of claim 1, further comprising a processor to communicate with the memory, wherein the processor is programmed to load the code image into the interface port for execution by the digital signal processor if the incoming binary bit stream is received at the interface port.

3. The adaptor card of claim 1, further comprising a processor to communicate with the memory, wherein the processor is programmed to load a second code image into the interface port for execution by the digital signal processor if the signal mode of the incoming binary bit stream is not detected as one of the at least two potential signal modes.

4. The adaptor card of claim 1, the adaptor card further comprising a first buffer and a second buffer, the digital signal processor configured to extract a first group of bits and a second group of bits from the incoming binary bit stream, configured to push the first group of bits into the first buffer and the second group of bits into the second buffer, and further configured to test the first group of bits in the first buffer for the first telecommunication signal mode and the second group of bits in the second buffer for the second telecommunication signal mode.

5. The adaptor card of claim 4, wherein the first buffer includes a 64K buffer for storing eight bits for use to process and monitor a 64 kbps high level data link control (64K HDLC) signal, and the second buffer includes a 56K buffer for use to process and monitor a 56 kbps high level data link control (56K HDLC) signal.

6. The adaptor card of claim 4, wherein the first group of bits includes the second group of bits.

7. The adaptor card of claim 4, wherein the first signal mode includes a 64 kbps high level data link control (64K HDLC) mode and the second signal mode includes a 56 kbps high level data link control (56K HDLC) mode.

8. The adaptor card of claim 1, wherein the incoming binary bit stream includes an analog data stream.

9. The adaptor card of claim 1, further comprising a number of additional interface ports, wherein the interface ports are coupled to the communication link through a multiplexing bus.

10. The adaptor card of claim 1, wherein the communication link includes a link to a phone network.

11. The adaptor card of claim 1, wherein the communication link includes a link to an integrated services digital network (ISDN).

12. The adaptor card of claim 1, wherein the code image includes a process that continually analyzes the incoming binary bit stream for flags to provide a total count of flags, wherein the total count is indicative of at least one of at least two potential signal modes.

13. The adaptor card of claim 12, wherein the incoming binary bit stream conforms to a high-level data link control (HDLC) protocol, and wherein the flags are HDLC delimiters.

14. The adaptor card of claim 12, wherein the flags are idle flags.

15. The adaptor card of claim 1, wherein the measurement is a score based on detecting flags indicative of compliance with one of the at least two potential signal modes.

16. The adaptor card of claim 1, wherein the measurement is detecting an error free frame according to one of the at least two potential signal modes.

17. An adaptor card to reside in an interface slot of a computing device, comprising:
   an interface port to receive an incoming binary bit stream from a communication link, the incoming binary bit stream having a signal mode;
   an interface circuit to connect the interface port with the computing device; and
   means to analyze the incoming binary bit stream to detect the signal mode by analyzing the incoming binary bit stream to generate a measurement indicative of compliance with one of at least two potential signal modes, wherein the at least two potential signal modes includes at least a first telecommunication signal mode and a second telecommunication signal mode.

18. The adaptor card of claim 17, wherein the means to analyze the incoming binary bit stream includes:
   means to extract a first group of bits and a second group of bits from the incoming binary bit stream;
   means to store the first group of bits in a first location and the second group of bits in a second location; and
   means to test the first group of bits for the first telecommunication signal mode and the second group of bits for the second telecommunication signal mode.

19. The adaptor card of claim 18, wherein the first group of bits includes the second group of bits.

20. The adaptor card of claim 17, wherein the means to analyze the incoming binary bit stream to detect the signal mode includes means to process an analog data stream.

21. The adaptor card of claim 17, further comprising means to determine a score for the at least two potential signal modes to indicate that the signal mode of the incoming binary bit stream conforms to one of the at least two potential signal modes when a target score is reached.

22. The adaptor card of claim 17, further comprising means to identify when an error-free frame has been successfully decoded in order to indicate that the signal mode of the incoming binary bit stream conforms to a potential signal mode that corresponds to the error-free frame.

23. The adaptor card of claim 17, wherein the means to analyze includes a process that continually analyzes the incoming binary bit stream for the flags to provide a total count of the flags, wherein the total count is indicative of at least one of the at least two potential signal modes.

24. The adaptor card of claim 23, wherein the means to analyze the incoming binary bit stream analyses the binary bit stream for compliance with at least two signal modes conforming to high-level data link control (HDLC) protocols.

25. The adaptor card of claim 23, wherein the flags are idle flags.

26. The adaptor card of claim 17, wherein the measurement is a score based on detecting flags indicative of compliance with one of the at least two potential signal modes.

27. The adaptor card of claim 17, wherein the measurement is detecting an error free frame according to one of the at least two potential signal modes.

28. An adaptor card, comprising:
an interface circuit to communicate with a computing device;
a plurality of interface ports, wherein each interface port includes a digital signal processor, each of the plurality of interface ports communicatively coupleable via a communications link to a data communications network for use in receiving an incoming binary bit stream having a signal mode;
a processor to communicate with the interface circuit;
a multiplexing bus to connect the plurality of interface ports to the communication link; and
a memory coupled to the processor, wherein the memory includes at least one code image and further includes a first memory location to store a first data set from the incoming binary bit stream for use to process and monitor a first potential signal mode and a second memory location to store a second data set from the incoming binary bit stream for use to process and monitor a second potential signal mode, wherein executing the code image processes the incoming binary bit stream in the first potential signal mode and the second potential signal mode to detect the signal mode of the incoming binary bit stream.

29. The adaptor card of claim 28, wherein executing the code image identifies the signal mode of the incoming binary bit stream when an error-free frame has been successfully decoded according to one of the first and second potential signal modes.

30. The adaptor card of claim 28, wherein executing the code image further including (a) analyzing the incoming binary bit stream for at least idle flags representing the first and second potential signal modes, (b) generating a score for each of the first and second potential signal modes, and (c) identifying the signal mode of the incoming binary bit stream when a target score for either the first or second potential signal mode is first reached.

31. The adaptor card of claim 28, wherein the digital signal processor is adapted to extract a group of bits from the incoming binary bit stream, adapted to store the group of bits in the first memory location, and adapted to store a subset of the group of bits in the second memory location.

32. The adaptor card of claim 31, wherein the first memory location includes a first buffer and the second memory location includes a second buffer.

33. The adaptor card of claim 31, wherein the first memory location includes a 64K buffer to store eight bits from the incoming binary bit stream and the second memory location includes a 56K buffer to store seven bits from the incoming binary bit stream.

34. A method, comprising:
extracting a group of bits from an incoming binary bit stream, the incoming binary bit stream having a signal mode;
storing the group of bits in a first memory location for use to process the incoming binary bit stream in a first potential signal mode;
storing a subset of the group of bits in a second memory location for use to process the incoming binary bit stream in a second potential signal mode; and
processing the group of bits in the first memory location and the subset of the group of bits in the second memory location using a processor to identify the signal mode of the incoming binary bit stream as one of the first potential signal mode and the second potential signal mode,
decoding the incoming binary bit stream in accordance with the signal mode using the processor.

35. The method of claim 34, wherein:
storing the group of bits in a first memory location includes storing eight bits from the incoming binary bit stream in a 64K buffer for use to process the incoming binary bit stream in a 64 kbps high level data link control (64K HDLC) mode; and
storing a subset of the group of bits in a second memory location includes storing seven least-significant bits in a 56K buffer for use to process the incoming binary bit stream in a 56 kbps high level data link control (56K HDLC) mode.

36. The method of claim 34, wherein processing the group of bits in the first memory location and the subset of the group of bits in the second memory location to identify the signal mode of the incoming binary bit stream as one of the first and second potential signal modes includes identifying the signal mode of the input signal when an error-free frame has been successfully decoded under one of the first and second potential signal modes.

37. The method of claim 34, wherein processing the group of bits in the first memory location and the subset of the group of bits in the second memory location to identify the signal mode of the incoming binary bit stream as one of the first and second potential signal modes includes generating a score for the first and second potential signal modes, and identifying the signal mode of the incoming binary bit stream when a target score is reached.

* * * * *

UNITED STATES PATENT AND TRADEMARK OFFICE
CERTIFICATE OF CORRECTION

PATENT NO.        : 7,602,805 B2
APPLICATION NO. : 10/652060
DATED             : October 13, 2009
INVENTOR(S)       : Gary Parnes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1731 days.

Signed and Sealed this

Fourteenth Day of December, 2010

David J. Kappos
*Director of the United States Patent and Trademark Office*